Aug. 14, 1934.  K. R. MANVILLE  1,970,098

TRANSMISSION MECHANISM

Filed Nov. 29, 1930  3 Sheets-Sheet 1

INVENTOR
Keith R. Manville,
BY
Redding, Greeley, O'Shea & Campbell
HIS ATTORNEYS

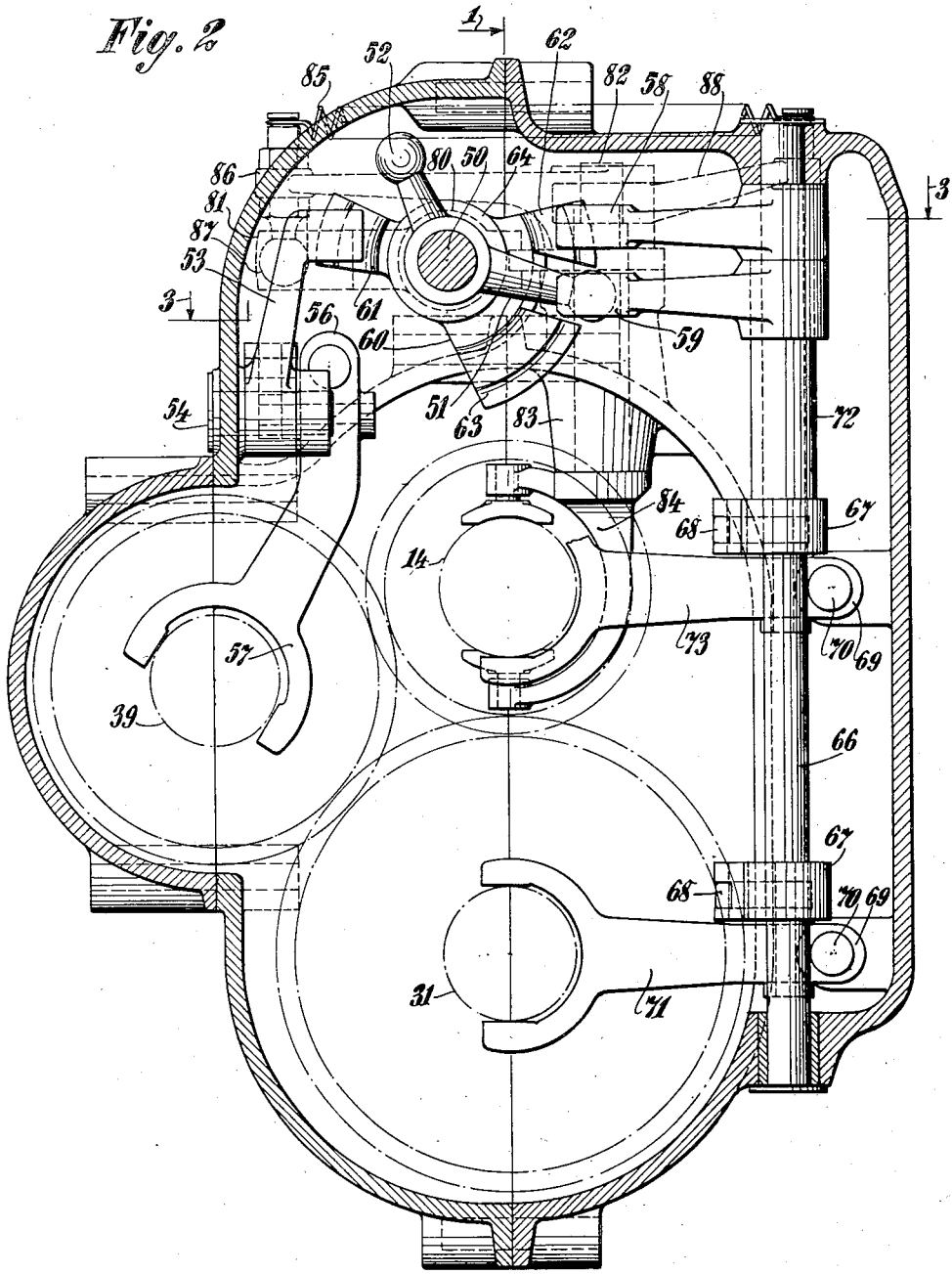

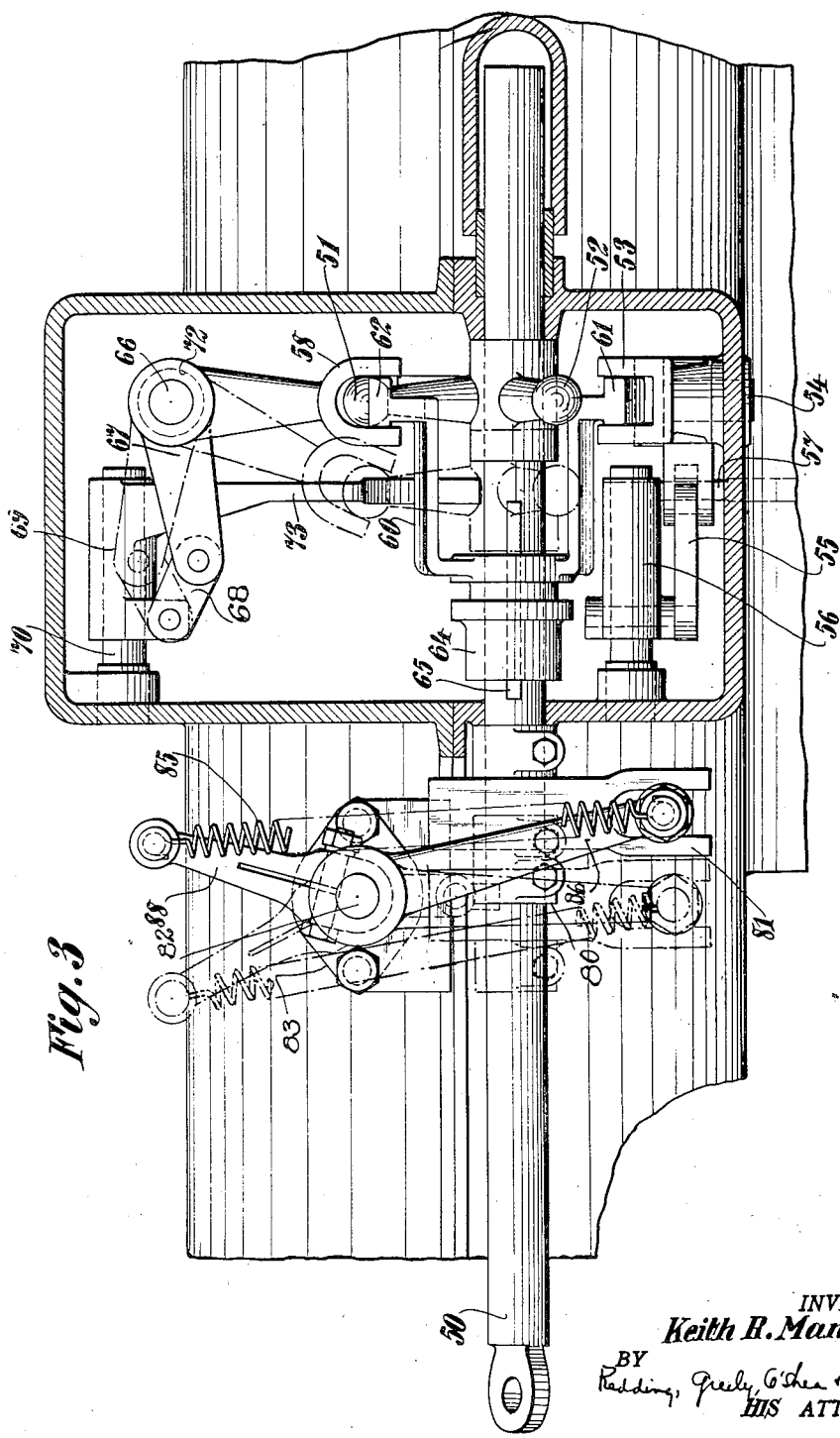

Patented Aug. 14, 1934

1,970,098

UNITED STATES PATENT OFFICE 1,969,098

TRANSMISSION MECHANISM

Keith R. Manville, Highland Park, N. J., assignor to International Motor Company, New York, N. Y., a corporation of Delaware Application November 29, 1930, Serial No. 499,032

3 Claims. (Cl. 74—473)

The present invention relates to transmission mechanisms for motor vehicles and embodies, more specifically, an improved mechanism, wherein the number of speed changes afforded by a standard vehicle transmission is multiplied by the incorporation of an auxiliary transmission in the mechanism, the shifting mechanism being so designed as to not only select the proper gear of the main transmission but also in connection therewith, the proper connection of the auxiliary transmission.

More specifically, the invention includes an improved controlling mechanism for transmissions of the above character, the controlling mechanism automatically actuating the auxiliary transmission in proper relationship with respect to the main transmission. The need for a greater range of speed ratios than that afforded by main transmissions previously designed has led to the development of mechanisms wherein an auxiliary gear set is employed to multiply the number of speed changes afforded by the standard transmissions. This auxiliary gear set has frequently been operated by a separate lever, the actuation of such lever being accomplished entirely at the discretion of the operator. Not only is this structure frequently undesirable because of the increase in the number of control mechanisms which require the attention of the operator, but this structure has frequently been found to be undesirable from a production standpoint. With a view, therefore, to providing a multi-range transmission, the present invention proposes to employ an auxiliary gear set, as outlined above, in connection with a standard transmission, the controlling mechanism for such set being so synchronized that proper shifting is insured.

A further object of the invention is to provide a controlling mechanism, wherein the shifting mechanism for the auxiliary gear set is actuated concurrently with the actuation of the gear sets of the main transmission, such actuation being effected by a common gear shift lever.

Further objects, not specifically enumerated above, will be apparent as the invention is described in greater detail in connection with the accompanying drawings, wherein:

Figure 2 is a view in section, taken on line 2—2 of Figure 1, and looking in the direction of the arrows.

Figure 1:
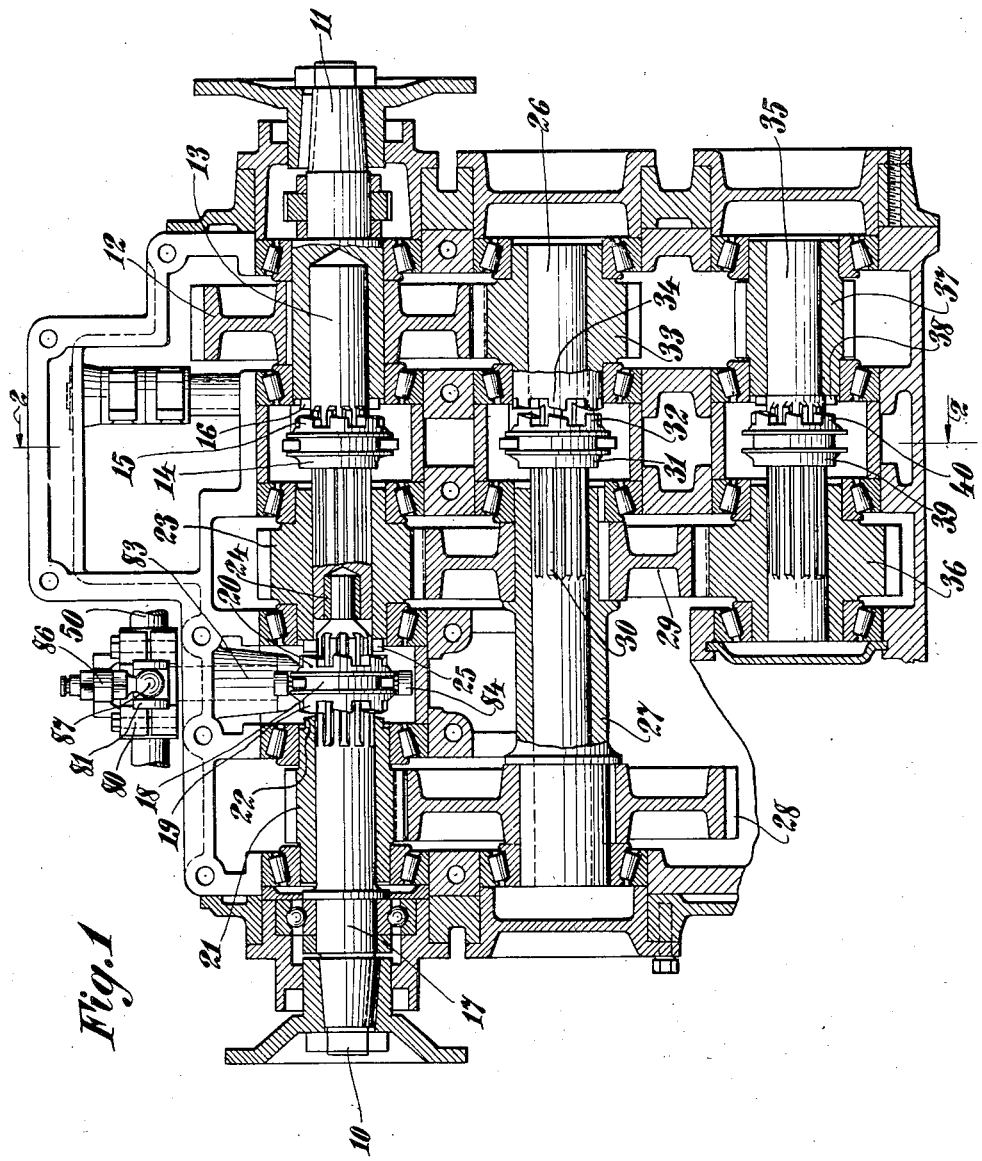
Figure 1 is a view in section, taken on line 1—1 of Figure 2, and looking in the direction of the arrows.

Figure 3 is a view in section, taken on line 3—3 of Figure 2, and looking in the direction of the arrows. In the position shown in Figure 3, the clutch teeth 19 engage the teeth 22 and the teeth 32 engage teeth 34.

Referring to the above drawings, a suitable connection 10 affords a means for supplying power to the transmission mechanism described herein, any suitable power source being utilized. The transmission tail shaft is shown at 11 and has splined thereto, a gear 12. The tail shaft journals a shaft section 13 in the left end thereof, as viewed in Figure 1. Shaft section 13 carries a sliding sleeve 14 which is splined thereto and formed with clutch teeth 15 which are adapted to engage with mating teeth 16 on the tail shaft to cause the tail shaft and shaft section 13 to rotate together.

The shaft section 13 drives a shaft 17 which has splined thereto a sleeve 18 having oppositely extending clutch teeth 19 and 20. A gear 21 is journaled rotatably upon shaft 17 and the hub thereof is formed with clutch teeth 22 which are adapted to mate with teeth 19. Shaft section 13 also carries a gear 23 which is secured thereto against rotation, this shaft section journalling the inner end of shaft 17 at 24. Clutch teeth 25 are formed on the hub of gear 23 and are adapted to mate with clutch teeth 20 on the sleeve 18, thus transmitting the drive from driving shaft 17 directly to the shaft section 13.

Journaled within the transmission housing is another shaft 26 upon which a sleeve 27 is rotatably mounted. This sleeve has splined thereto a gear 28 which permanently engages gear 21 and likewise has splined thereto a gear 29 which permanently engages with gear 23. The countershaft is splined at 30 and slidably carries a sleeve 31 which is formed with clutch teeth 32. Mounted rotatably upon the countershaft is a gear 33, in the hub of which clutch teeth 34 are formed to mate with clutch teeth 32. Gear 33 permanently engages gear 12.

A reverse countershaft 35 is likewise journaled within the transmission housing and has secured thereto a gear 36 which permanently engages gear 29. The reverse countershaft also rotatably journals a pinion 37 which permanently engages gear 12 and the hub of which is formed with clutch teeth 38. A sleeve 39 is splined to the reverse countershaft and is formed with clutch teeth 40 which mate with clutch teeth 38 to secure the reverse countershaft and pinion 37 to rotate as a unit.

It will thus be seen that gears 23, 29, 12, 33, 36 and 37 form the standard or main transmission while gears 21 and 28 constitute the auxiliary transmission.

The speeds afforded by the mechanism described above include four forward speeds and two reverse speeds. The first forward speed is obtained by engaging clutch teeth 19 with clutch teeth 22 and clutch teeth 32 with clutch teeth 34. This causes the drive to be transmitted from shaft 17 through pinion 21, gear 28, pinion 33, gear 12 and tail shaft 11. The second forward speed is obtained by mating clutch teeth 20 with clutch teeth 25, causing the drive to be transmitted from the shaft 17, through pinion 23, gear 29, pinion 33, and gear 12. To engage teeth 20 and 25, the arm 86 is moved from the full line position of Figure 3 to the dot and dash line position. In so doing, arm 67 swings from its full to its dot and dash position in Figure 3 thus moving fork 73 and teeth 32 out of engagement with teeth 34 and then back again into engagement. The third forward speed is obtained by engaging clutch teeth 19 with teeth 22 and engaging clutch teeth 15 with teeth 16. This causes the drive to be transmitted through pinion 21, gear 28, gear 29, pinion 23, and through shaft section 13 to shaft 11. The fourth or direct speed is obtained by engaging teeth 20 with teeth 25, and teeth 15 with teeth 16. This causes shaft 17 to drive shaft section 13 which, in turn, drives tail shaft 11. The reverse speeds are obtained by engaging clutch teeth 19 with clutch teeth 22, and clutch teeth 40 with teeth 38. This causes the drive to be transmitted through pinion 21, gear 28, gear 29, gear 36, pinion 37 and gear 12, to the tail shaft 11, thus giving the low reverse speed. The second or high reverse speed is obtained by engaging clutch teeth 20 and 25 and teeth 38 and 40. This causes the drive to be transmitted through gear 23, gear 29, gear 36 and pinion 37 to the gear 12 and tail shaft 11.

In order that these speeds may be secured effectively, a controlling mechanism is provided which includes a selector shaft 50 operated in any well known manner by a gear shifting lever. The shaft is mounted slidably and rotatably in the top of the transmission housing and is provided with shifter fingers 51 and 52. Finger 52 is adapted to be rocked into engagement with a bifurcated lever 53 which is journaled at 54 in the transmission housing and is connected with a link 55 which actuates a sleeve 56 for shifting a shifter fork 57 which is adapted to shift the sleeve 39. In this fashion, finger 52 controls the directional gear to provide for forward or reverse movement.

Shifter fork 51 is adapted to rock into engagement with either bifurcated lever 58 or lever 59. A locking disc 60 is formed with an arm 61 which is adapted to engage the bifurcated lever 53 when either of the levers 58 and 59 are engaged by the finger 51 while arms 62 and 63 are provided for engaging either bifurcated lever 58 or 59 when the finger 51 engages the other or when the finger 52 engages lever 53. The disc is preferably formed upon a hub 64 which is slidably mounted upon selector shaft 50 and keyed thereto at 65 to prevent relative rotation between the hub and shaft.

Lever 58 is keyed to a shaft 66 which is journaled in the transmission housing and is formed with an arm 67 connected by link 68 to the lower of two sleeves 69 which is slidable upon a stub shaft 70. Sleeve 69 also carries a shifting fork 71 which is adapted to engage sleeve 31 to slide the same upon the countershaft.

Lever 59 is keyed to a sleeve 72 which is formed with a lever similar to lever 67 and which actuates, in a similar fashion, a shifter fork 73 which slides the sleeve 14 upon the shaft section 13.

A bushing 80 is clamped to the selector shaft 50 and formed with a bifurcated arm 81. A shaft 82 is journaled within a bushing 83, formed in the transmission housing and carries a shifter fork 84 which engages the sleeve 18. Movement of the shaft in either direction engages the respective clutch teeth, as described above, and the shaft is preferably loaded by means of a spring 85 to maintain either set of clutch teeth in engagement. To actuate the shaft 82, a lever 86 is journaled thereon rotatably. The end of the lever is formed with a ball fitting 87 and one end of spring 85 is secured thereto. A second lever 88 is secured to the shaft 82, to turn therewith. The other end of spring 85 is connected to the end of lever 88 and thus snaps the sleeve 18 into either position as the ball fitting 87 moves through dead center in either direction.

The operation of the foregoing mechanism will be seen to include the shifting of sleeve 18 with each change in the respective gear sets. Selector shaft 50 is first moved toward the left, as viewed in Figure 3 after having been rocked to such position that finger 51 engages lever 58. Such axial movement of the selector shaft, when rocked into this position, actuates fork 71 to engage clutch teeth 32 and 34, also snapping clutch teeth 19 into engagement with teeth 22. The engagement of the said last two teeth occurs subsequent to the engagement of the first teeth, thus providing a quiet shifting operation. To advance the mechanism into the second forward speed position, the selector shaft is shifted axially without rocking to snap the gear teeth 20 into engagement with teeth 25. Incidentally, clutch teeth 32 and 34 are disengaged during such movement but are re-engaged prior to the final engagement of teeth 20 and 25. The transmission of power in these positions takes place as previously outlined.

The third forward speed is obtained by rocking shaft 50 until finger 51 engages lever 59, and then moving the shaft 50 axially to the left, causing clutch teeth 15 and 16 to be engaged, at the same time snapping clutch teeth 19 and 22 into engagement. The fourth or direct forward speed is obtained by shifting the selector shaft 50 axially to the right, causing clutch teeth 20 and 25 to be engaged while clutch teeth 15 and 16 are engaged.

The reverse speeds are obtained by rocking selector shaft until finger 52 engages bifurcated lever 53 and then shifting the selector shaft 50 axially in opposite directions to obtain the two reverse speeds outlined above.

From the foregoing description, it will be seen that the speed change mechanism is simple in construction and operation, the elements functioning effectively by the manipulation of a single shifting mechanism. While the invention has been described with specific reference to the accompanying drawings, it is not to be limited, save as defined in the appended claims.

I claim as my invention:

1. A shifting mechanism for a transmission comprising a plurality of shifting means, a single shifting means for effecting a plurality of shifting operations, a loading spring for maintaining the single shifting means normally in a selected position, and uni-directionally operated means for actuating the last named shifting means upon and subsequent to the actuation of one of the plurality of shifting means.

2. A shifting mechanism for a transmission comprising a selector and shifter shaft, common means to effect a plurality of shifting operations, independent means to effect separate shifting operations, means on the shaft for actuating the common means upon axial movement of the shaft, a second shaft having an arm for actuating one of the independent means, a sleeve journaled on the shaft and having an arm for actuating another of the independent means, and means on the second shaft and sleeve engageable selectively by the first shaft for actuating the second shaft and sleeve.

3. A shifting mechanism for a transmission comprising a single shifting means for effecting a plurality of different gear ratios, operating means movably connected to said shifting means for actuating the latter, said operating means being movable in one direction for effecting one gear ratio and being movable in the opposite direction for effecting another gear ratio, and a plurality of additional shifting means for respectively effecting still other gear ratios, said operating means being selectively cooperable with said additional shifting means for actuating any one of the latter means simultaneously with said single shifting means upon movement of said operating means in either direction whereby any selected gear ratio may be obtained by movement of the operating means in one direction.

KEITH R. MANVILLE.